(12) United States Patent
Peng et al.

(10) Patent No.: US 10,939,309 B2
(45) Date of Patent: Mar. 2, 2021

(54) INTENT-DRIVEN RADIO ACCESS NETWORKING METHOD AND SYSTEM

(71) Applicant: BEIJING UNIVERSITY OF POSTS AND TELECOMMUNICATIONS, Beijing (CN)

(72) Inventors: Mugen Peng, Beijing (CN); Yangcheng Zhou, Beijing (CN); Shi Yan, Beijing (CN)

(73) Assignee: BELTING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 0 days.

(21) Appl. No.: 16/697,844

(22) Filed: Nov. 27, 2019

(65) Prior Publication Data
US 2020/0178093 A1    Jun. 4, 2020

(30) Foreign Application Priority Data

Nov. 29, 2018 (CN) .......................... 201811443971.8

(51) Int. Cl.
*H04W 24/02* (2009.01)
*H04W 36/00* (2009.01)
(Continued)

(52) U.S. Cl.
CPC ..... *H04W 24/02* (2013.01); *H04W 36/00837* (2018.08); *H04W 36/18* (2013.01); *H04W 72/085* (2013.01); *H04W 88/10* (2013.01)

(58) Field of Classification Search
CPC ........... H04W 24/02; H04W 36/00837; H04W 36/18; H04W 72/085; H04W 88/10;
(Continued)

(56) References Cited

U.S. PATENT DOCUMENTS

2016/0007399 A1*  1/2016  Lim .................. H04L 69/18
                                                  370/329
2016/0353465 A1* 12/2016  Vrzic ................ H04W 28/0247
(Continued)

FOREIGN PATENT DOCUMENTS

CN          106792739          5/2017
CN          106922002          7/2017
(Continued)

OTHER PUBLICATIONS

Xiang et al., "Edge computing and network slicing technology in 5G", 2017, China, 10 pgs. English Abstract attached. No assertion of relevance is being made.
(Continued)

*Primary Examiner* — Anthony S Addy
*Assistant Examiner* — Farid Seyedvosoghi
(74) *Attorney, Agent, or Firm* — Grossman, Tucker, Perreault & Pfleger, PLLC

(57) ABSTRACT

The present application discloses an intent-driven radio access networking method, including: determining an intent, and performing a slice setting for a slice according to a type of the intent and network performance requirements indicated by the intent; determining an instantiation priority for each slice setting; performing performance evaluation for each existing slice within a network range indicated by the intent, and determining global configuration of each existing slice; after a new slice is added to the current network, configuring a networking mode and network multimode resources for the new slice according to the instantiation priority of the slice setting corresponding to the new slice.

9 Claims, 9 Drawing Sheets

(51) Int. Cl.
*H04W 36/18* (2009.01)
*H04W 72/08* (2009.01)
*H04W 88/10* (2009.01)

(58) Field of Classification Search
CPC ..... H04W 48/18; H04W 28/04; H04W 28/06; H04W 72/0493; H04W 72/10; H04W 84/18; H04W 48/12; H04W 48/16; H04W 48/20; H04W 88/06; H04W 16/10; H04W 16/14; H04W 28/16; H04W 72/04; H04W 76/10; H04W 72/082; H04W 24/00; H04W 28/24; H04W 28/18; H04W 72/02; H04W 72/0406; H04W 72/0413; H04W 72/042; H04W 72/0426; H04W 72/044; H04W 72/0446; H04W 72/0453; H04W 72/048; H04W 72/0486; H04W 72/06; H04W 72/08; H04W 72/087; H04W 74/00; H04W 74/004; H04W 74/006; H04W 74/06; H04W 74/0083; H04W 74/0866; H04W 28/26; H04W 84/04; H04W 84/06; H04W 76/00; H04W 72/12; H04W 74/04; H04M 1/733; H04M 1/72511; H04M 1/72505; H04L 2025/0342; H04L 27/362; H04L 27/34; H04L 27/206; H04L 12/40065; H04L 12/4604; H04L 5/26; H04L 1/0048; H04Q 9/12; H04Q 5/12; H04Q 2213/394; H03H 7/46; H04B 1/0014; H04B 7/2618; H04B 7/18576; H04B 7/18571; H04B 7/18528; H04B 7/2123; H04B 7/2121; H04B 7/2615; H04B 2201/70726; H04B 7/2668; H04B 7/216; G06F 17/14; G06F 17/145; G06F 17/147; H04J 3/1694; H04J 2203/0069; H04J 4/00; H04J 2203/0091
USPC ......... 455/434, 450, 452.1, 452.2, 464, 509, 455/515; 370/203, 206, 208, 322, 328, 370/329, 330, 335, 336, 338, 343, 345
See application file for complete search history.

(56) References Cited

U.S. PATENT DOCUMENTS

2018/0359337 A1* 12/2018 Kodaypak ............... H04L 43/08
2020/0022017 A1* 1/2020 Raghavan ............. H04W 24/08

FOREIGN PATENT DOCUMENTS

CN 106954267 7/2017
CN 107819695 3/2018

OTHER PUBLICATIONS

English machine translation of Office Action from corresponding Chinese Appln. No. 201811443971.8, dated Feb. 21, 2020.

* cited by examiner

INTENT-DRIVEN RADIO ACCESS NETWORKING METHOD AND SYSTEM

This application claims the benefit and priority of Chinese Patent Application No. 201811443971.8, entitled "Intention-Driven Radio Access Networking Method and System" and filed on Nov. 29, 2018. The entire disclosures of each of the above applications are incorporated herein by reference.

TECHNICAL FIELD

The present application relates to access technologies in a communication system, and more particularly to an intent-driven radio access networking method and system.

BACKGROUND

In recent years, the rise and rapid development of the fifth-generation mobile communication systems (5G), mobile Internet of Things (mIoT) and Artificial Intelligence (AI) have led to a new information technology revolution, and also promoted the upgrading of the tertiary industry such as the service industry. Intelligent services based on information technology have technical and knowledge-intensive characteristics, can automatically identify the explicit and implicit requirements of users, and can actively, efficiently, safely and greenly provide services meeting the requirements. Based on historical characteristic data of the users, the intelligent services can independently identify the current requirements of the users, explore the potential requirements of the users, and actively provide the users with high-value personalized services. The intelligent service is an important breakthrough and growth point for industrial restructuring and upgrading.

At present, the intelligent services have just been applied at home and abroad, but are developing rapidly. In a smart home industry, Amazon has launched the Echo and Google has launched the Google Home, both of which serve as home-level smart gateways for the remote control of home devices. In the smart city industry, some companies such as Google, Baidu and IBM have released smart transportation and driverless solutions respectively. Some companies such as Didi, Uber and Mobike have preliminarily implemented optimization deployment and intelligent operation for urban public service resources.

For most of existing intelligent services, the seamless interconnection between humans, machines and objects may be achieved based on the existing Radio Access Networks (RANs) through joint centralized cloud computing and underlying interactive sensing devices. The users have increasing requirements on the intelligent services, for example, hope that the service can be opened at a rapid speed, the network failure can be eliminated in time and Quality of Service (QoS) can be guaranteed in an end-to-end manner. However, the traditional operator network has an equipment-centric network operation and maintenance mode, lacks an agile operation system and thus is difficult to maintain the optimal network performance Besides, the traditional operator network relies on a small number of security features to protect the intelligent services, and thus is difficult to adapt the uncertainty of future service development.

Only a user-centric network can effectively meet the requirements of the users and support the services of operators. Through constructing a digital world between a physical network and an intelligent service intent, an intent-driven RAN may drive an elevation from a fixed RAN to a flexible and dynamic RAN. Further, the intent-driven RAN may accurately identify a user's intelligent service intent, perform the end-to-end self-configuration of the RAN, sense the quality of the user's experiences and network performance in real time, and perform predictive analysis and intelligent optimization.

At present, there is no networking method for such intent-driven RAN.

SUMMARY

Embodiments of the present application provide an intent-driven radio access networking method and system, and a non-transitory computer-readable medium, by which an Intent-Driven Radio Access Network (ID-RAN) can be constructed.

To achieve the above objectives, the solutions of the embodiments of the present application are implemented as follows.

An intent-driven radio access networking method comprises:

determining an intent, and performing a slice setting for a slice according to a type of the intent and network performance requirements indicated by the intent, wherein the slice setting comprises a scenario corresponding to the slice and threshold requirements of each network performance indicator indicated by the slice;

determining an instantiation priority for each slice setting;

performing performance evaluation for each existing slice within a network range indicated by the intent, and determining whether each existing slice meets performance requirements of each slice setting; when an existing slice meets performance requirements of any slice setting, reserving the existing slice; when an existing slice does not meet performance requirements of each slice setting and a difference between performance of the existing slice and performance of each slice setting exceeds a preset range, deleting the existing slice, and releasing network resources related to the existing slice; when an existing slice does not meet the performance requirements of each slice setting but a difference between performance of the existing slice and performance of any slice setting is within the preset range, reserving and optimizing the existing slice; when each existing slice does not meet the performance requirements of any slice setting and a difference between performance of the existing slice and the performance of each slice setting exceeds the preset range, adding a new slice to a current network according to an instantiation priority of slice setting corresponding to the new slice;

after the new slice is added to the current network, configuring a networking mode and network multimode resources for the new slice according to the instantiation priority of slice setting corresponding to the new slice.

An intent-driven radio access networking system comprises: a translation module, a conflict resolution module, an evaluation module and an activation module; wherein the translation module is configured to determine an intent, and perform a slice setting for a slice according to a type of the intent and network performance requirements indicated by the intent, wherein the slice setting comprises a scenario corresponding to the slice and threshold requirements of each network performance indicator indicated by the slice;

the conflict resolution module is configured to determine an instantiation priority for each slice setting;

the evaluation module is configured to perform performance evaluation for each existing slice within a network range indicated by the intent, and determine whether each existing slice meets performance requirements of each slice setting; when an existing slice meets performance requirements of any slice setting, reserve the existing slice; when an existing slice does not meet performance requirements of each slice setting and a difference between performance of the existing slice and performance of each slice setting exceeds a preset range, delete the existing slice, and release network resources related to the existing slice; when an existing slice does not meet the performance requirements of each slice setting but a difference between performance of the existing slice and performance of any slice setting is within the preset range, reserve and optimize the existing slice; when each existing slice does not meet the performance requirements of any slice setting and a difference between performance of the existing slice and the performance of each slice setting exceeds the preset range, add a new slice to a current network according to an instantiation priority of slice setting corresponding to the new slice;

the activation module is configured to, after the new slice is added to the current network, configure a networking mode and network multimode resources for the new slice according to the instantiation priority of slice setting corresponding to the new slice.

A non-transitory computer-readable medium storing instruction which when executed by a computer causes the computer to perform the above intent-driven radio access networking method.

By the embodiments of the present application, an intent-driven radio access network can be constructed.

DETAILED DESCRIPTION

In order to make the objects, technical solutions and advantages of the present application clearer, the present application will be described in detail below with reference to the accompanying drawings.

The core concept of Software Defined Network (SDN) is to separate forwarding from control to improve the efficiency and flexibility of the network. Based on wireless network operation and maintenance big data and wireless transmission big data and by using AI and automation technologies, an ID-RAN may perform predictive analysis and performance optimization, thereby achieving an evolution from the SDN to an Intent-Driven Core Network (ID-CN).

Thanks to the maturity of cloud computing, big data and AI technology, embodiments of the present application propose an intelligent and simple networking method for an ID-RAN based on the ID-CN with intelligent, simplified and ultra-fast features. The networking method can help operators to deal with the uncertainty and active recommendation of intelligent services from the access network level. The proposed ID-RAN contains the following three characteristics.

Firstly, the ID-RAN has a capability of predictive analysis. Based on the big data and AI technology, the ID-RAN may identify the network failure in advance, and perform optimization and failure elimination actively.

Secondly, the ID-RAN may completely simplify the architecture, protocols, access sites, operation and maintenance of the RAN, and implement the self-configuration, automation and self-healing of the RAN throughout its life cycle, Thirdly, the ID-RAN may be self-adapted to different physical layer transmission technologies to meet the networking requirements for massive connections, ultra-low delay and ultra-wide bandwidth.

Figure 1:
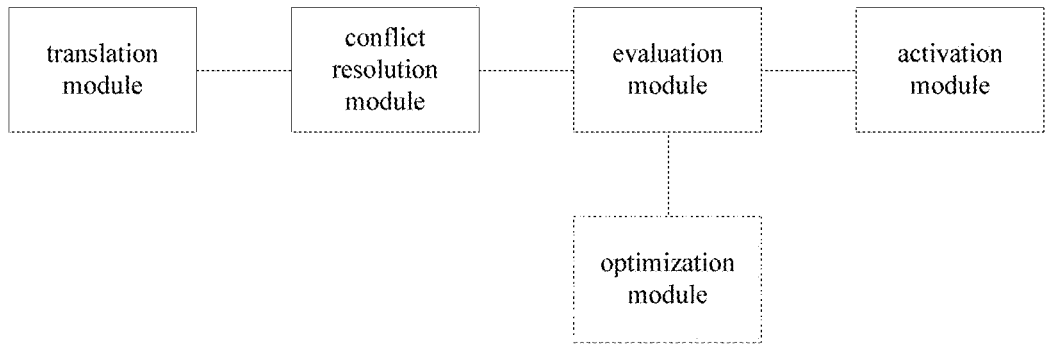
FIG. 1 is a diagram illustrating the structure of an intent-driven radio access networking system according to embodiments of the present application.

FIG. 1 is a diagram illustrating the structure of an intent-driven radio access networking system according to embodiments of the present application. As shown in FIG. 1, the system includes: a translation module, a conflict resolution module, an evaluation module and an activation module. To achieve a better system performance, the system may further include an optimization module. Further, the evaluation module may include a centralized evaluation module and a distributed evaluation sub-module, and the optimization module may include a centralized optimization module and a distributed optimization sub-module.

Figure 2:
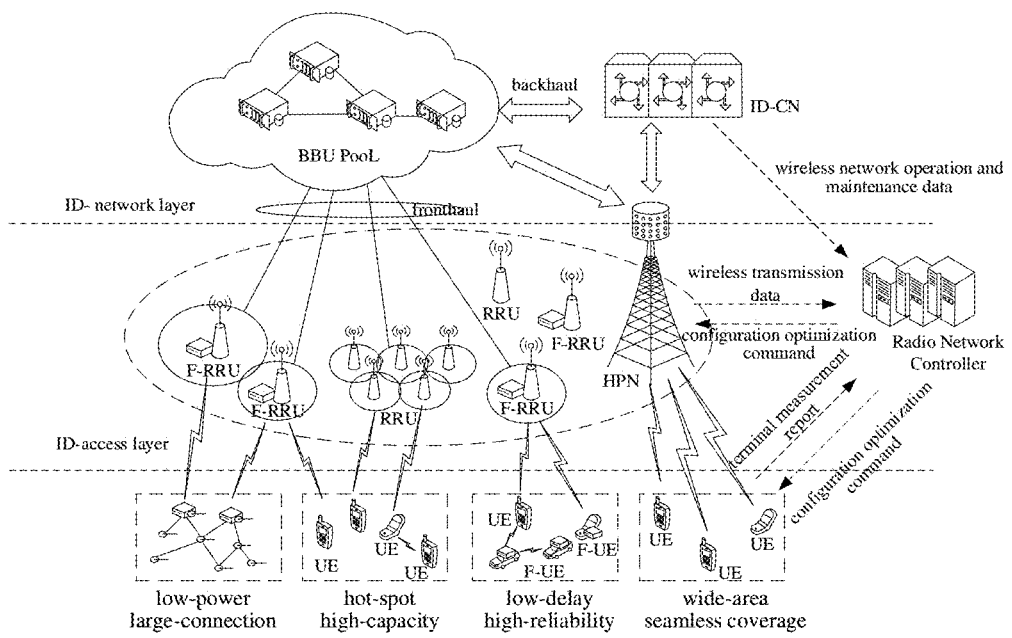
FIG. 2 is a diagram of an intent-driven radio access network according to embodiments of the present application.

FIG. 2 shows a diagram of an intent-driven radio access network according to embodiments of the present application. The translation module and the conflict resolution module may be located in a Radio Network Controller (RNC). The RNC may be located in a centralized cloud, a base station controller, or a macro base station with network management function in RANs. The RNC is configured to perform intent translation, intent conflict resolution, centralized data collection and processing, network configuration activation, network performance evaluation and resource optimization management. Further, the RNC may obtain operation and maintenance data of network layer and access layer of the RAN, wireless transmission data and a terminal measurement report, and deliver a network configuration command and a resource optimization command to the access layer. In order to realize the efficient operation of network management strategies, distributed data collection and processing, network performance evaluation and network resource optimization may be performed in a base station and a terminal which both have a fog calculation function. The centralized data collection and processing function of the RNC and the distributed data collection and processing function in network nodes constitute a data collection processor of the RAN.

Figure 3:
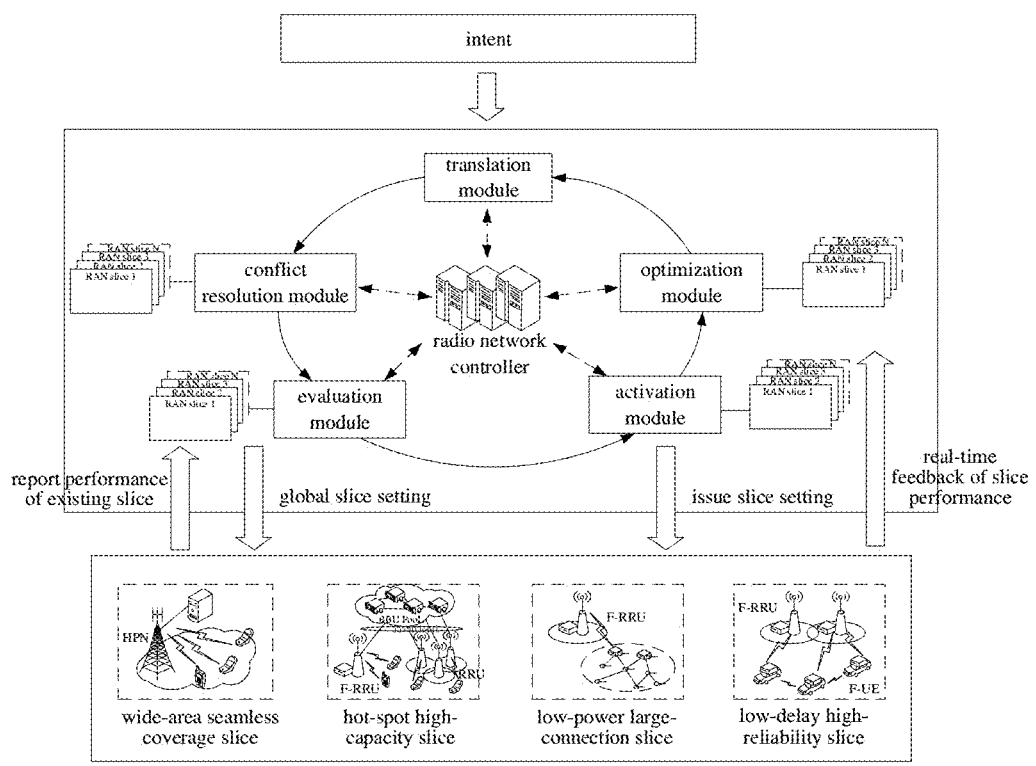
FIG. 3 is a diagram of periodic transfer of five functional modules in an intent-driven radio access network according to embodiments of the present application.

The embodiments of the present application utilizes the operation and maintenance big data, the wireless transmission big data and the terminal measurement big data collected by the data collection processor to perform the functions of the five functional modules sequentially and periodically in an order of intent translation, intent conflict resolution, network performance evaluation, network configuration activation and network resource optimization. The network implementation of different intents is deployed in a manner of the RAN slice. FIG. 3 shows a diagram of periodic transfer of five functional modules in the ID-RAN according to embodiments of the present application.

Figure 4:
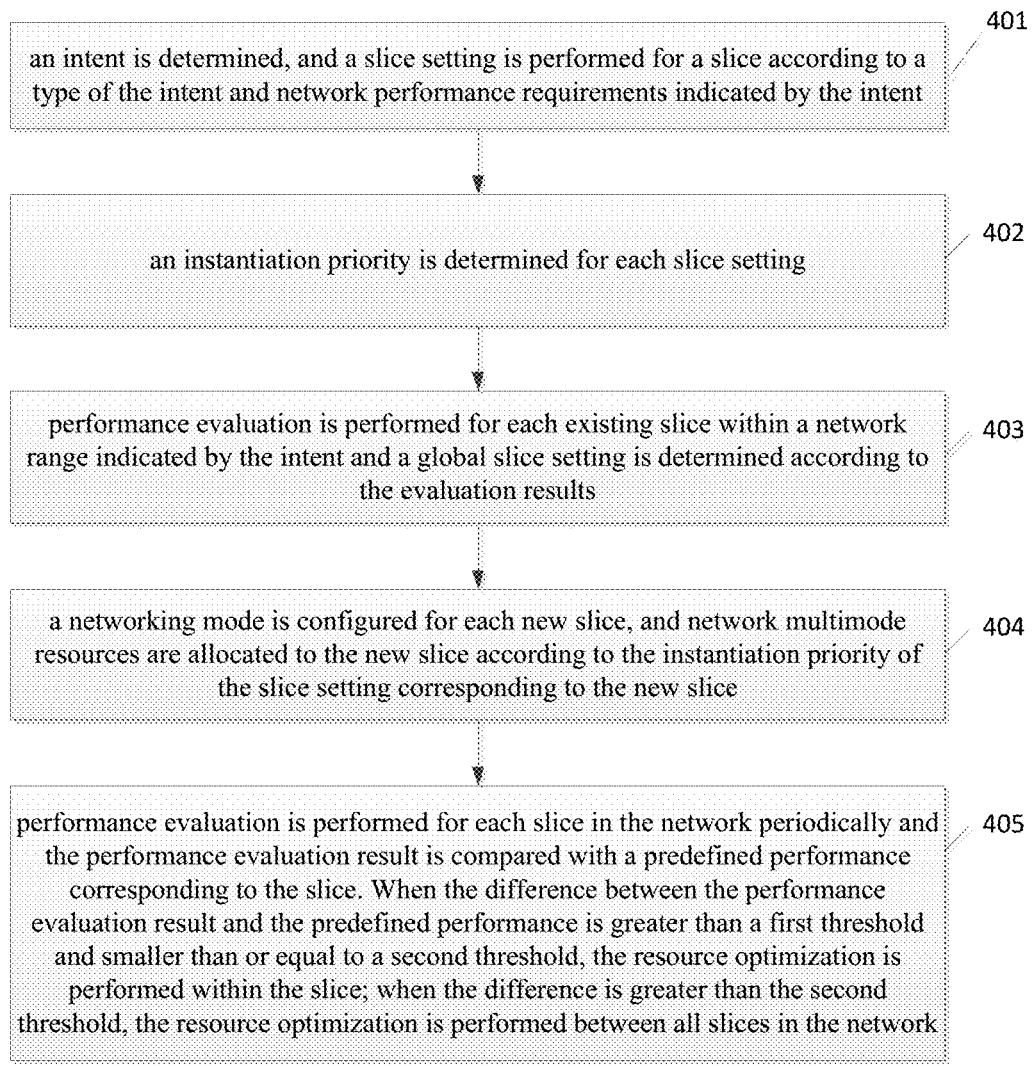
FIG. 4 is a flowchart of an intent-driven radio access networking method according to embodiments of the present application.

FIG. 4 is a flowchart illustrating a process of an intent-driven radio access networking method according to embodiments of the present application. The specific steps of the intent-driven radio access networking method will be described below with reference to FIG. 1 to FIG. 4.

At step 401, an intent is determined, and a slice setting is performed for a slice according to a type of the intent and network performance requirements indicated by the intent.

This step may be performed in the translation module.

A manner of determining the intent may be performed as follows. For example, in an initial stage of each intent implementation cycle, the RNC receives wireless network operation and maintenance data collected by the ID-CN and the data collection processor through a probe, a terminal measurement report and wireless transmission data uploaded by a base station, and determines the intent according to the received data. Alternatively, the RNC directly receives an intent input by a network service customer or a network service provider. The translation module of the ID-RAN performs a slice setting according to the type of the intent and the network performance requirements indicated by the intent.

The data collection processor includes a centralized data collection processor and a distributed data collection processor. The centralized data collection processor may be located in a RNC, and the distributed data collection processor may be located in a base station or a terminal which has a fog calculation function. The translation module may obtain the intent according to the operation and maintenance big data obtained by the data collection processor from the core network, or according to the intent received from the core network and directly input by the network service customer or the network service provider. In some embodiments, the intents may be classified into three types, including a service intent, a performance intent and a management control intent. The translation module in the ID-RAN converts the service intent and the performance intent into different types of RAN slices, and converts the management control intent into a control signaling for the RNC. In the embodiments of the present application, the RAN is mainly composed of the RAN slices which are converted from the service intent and the performance intent. In practical applications, the intents are not limited to the above three types. The intents may include another type as long as it can reflect users' expectation for the network operation status.

According to application scenarios supported by the fifth-generation (5G) communication system, the RAN slices may be classified into four typical types, including a wide-area seamless coverage slice, a hot-spot high-capacity slice, a low-power large-connection slice and a low-delay high-reliability slice. In practical network deployment, a new slice type may be added according to intent-driven network requirements. The translation module mentioned herein may be located in the highest layer of the RAN and used as an interface with the ID-CN, and may also be used as a new protocol layer individually or embedded in the network layer of the existing RAN.

Figure 5:
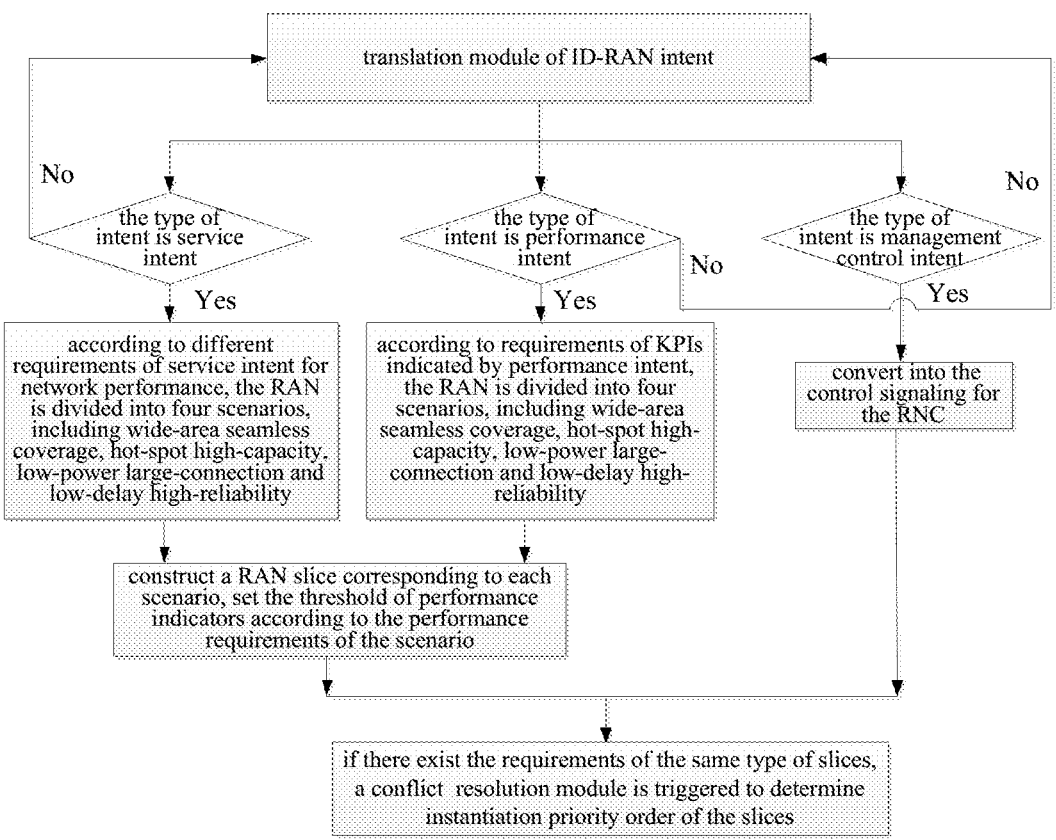
FIG. 5 is a diagram illustrating the workflow of a translation module in an ID-RAN according to embodiments of the present application.

The translation module is configured to perform a conversion process of network management strategy for the service intent, the performance intent and the management control intent. FIG. 5 shows a workflow of the translation module in the ID-RAN according to embodiments of the present application. The requirements of various Key Performance Indicators (KPIs) of the RAN indicated by the service intent and the performance intent are analyzed. In order to meet the intent requirements, the RAN is divided into the RAN slices, and the translation module of the ID-RAN outputs the slice settings of the RAN slices. In some embodiments, the slice settings of the RAN slices may include scenarios corresponding to the RAN slices (also referred to as slice types), for example, four slice types including the wide-area seamless coverage slice, the hot-spot high-capacity slice, the low-power large-connection slice and the low-delay high-reliability slice. The slice settings may also include threshold requirements of each network performance indicator indicated by the slices. The translation module converts the service intent for indicating the requirements of service type and the performance intent for indicating the threshold requirements of each network performance indicator into one or any combination of the above four slice types. In some embodiments, there may be an independent evaluation sub-module and an optimization sub-module within each slice, which are configured to perform performance evaluation and network resource optimization within the slice respectively. The translation process of the service intent and the performance intent will be described below in detail.

Figure 6:
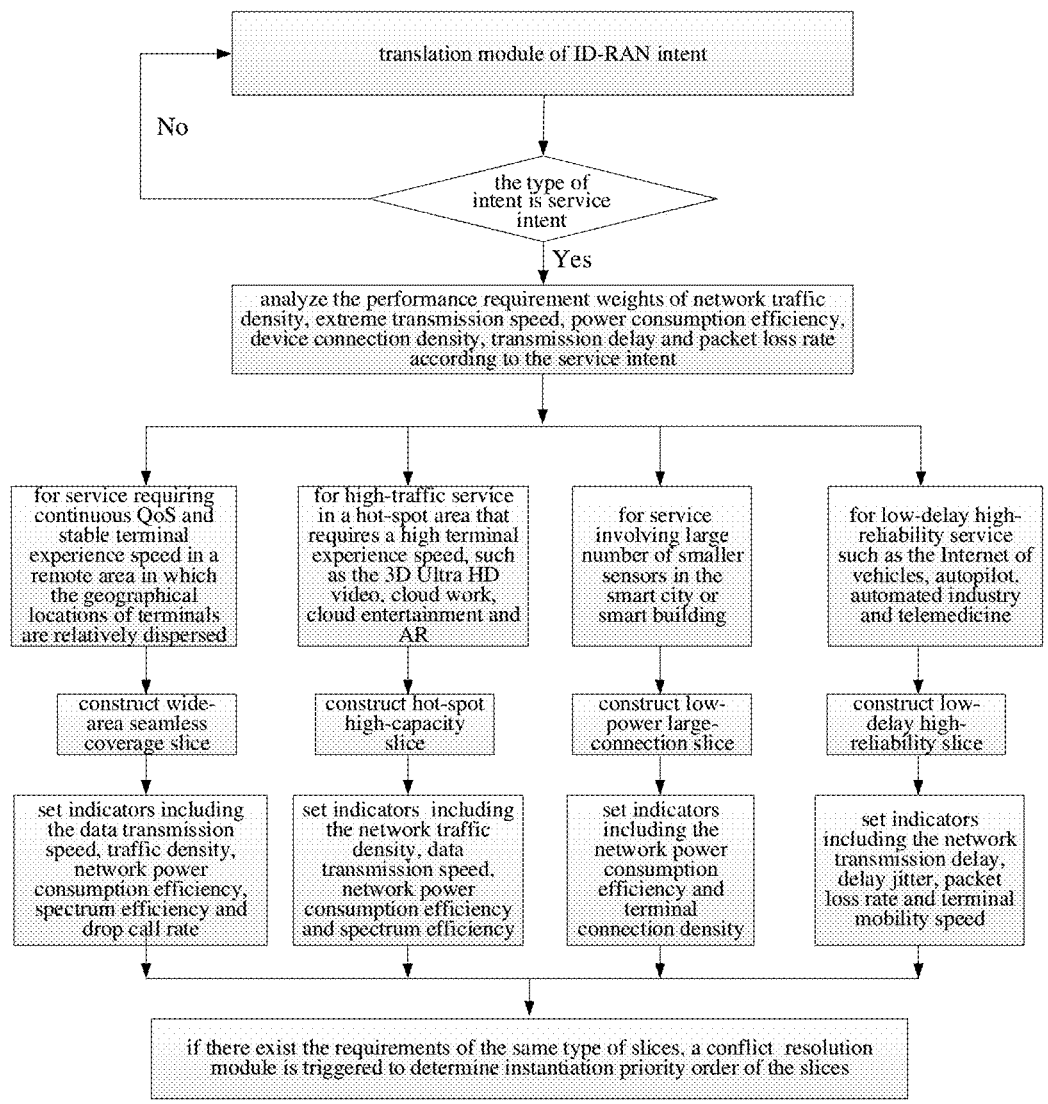
FIG. 6 is a diagram illustrating a translation process for a service intent according to embodiments of the present application.

The translation process of the service intent is shown in FIG. 6. The service intent is usually a customer's service requirements for the network. The service intent is not refined to a specific requirement for performance indicators. However, in order to meet the service requirement, some performance indicators and combinations thereof are necessary to meet specific requirement, thereby satisfying the customer's intent in overall service performance Therefore, according to the service requirement, the specific requirement for some performance indicators may be derived. Based on an analysis that is performed for the performance requirement weights of network traffic density, extreme transmission speed, power consumption efficiency, device connection density, transmission delay and packet loss rate according to the service intent, the translation module converts the service intent into a weighted combination of multi-dimensional performance indicators, and constructs a slice type supporting a corresponding service scenario. Afterwards, according to different service scenarios, thresholds of different network performance indicators are set, and the network is divided into RAN slices supporting multiple service types respectively.

In some embodiments, for a wide-area seamless coverage scenario in which the geographical locations of terminals are relatively dispersed and the terminals have high mobility, some indicators such as data transmission speed, traffic density, network power consumption efficiency, spectrum efficiency and drop call rate are required to be set for a slice corresponding to the wide-area seamless coverage scenario, so as to ensure that the terminals may have a high terminal experience speed during a continuous cell handover process in a remote area with a smaller traffic density. For a hot-spot high-capacity scenario in which a high-traffic service requiring a high terminal experience speed, such as a 3D Ultra High-Definition (HD) video, cloud work, cloud entertainment and Augmented Reality (AR), some indicators such as the network traffic density, the data transmission speed, the network power consumption efficiency and the spectrum efficiency are required to be set for a slice corresponding to the hot-spot high-capacity scenario, so as to ensure that the terminals have the high terminal experience speed in a hot-spot area with high traffic density. For a low-power large-connection scenario involving a large number of sensor devices in a smart city, some indicators such as the network power consumption efficiency and terminal connection density are required to be set for a slice corresponding to the low-power large-connection scenario, so as to ensure that a large number of IoT devices can access the network with low power costs. For a low-delay high-reliability scenario in vertical industries such as the Internet of vehicles and industrial control, some indicators such as the network transmission delay, delay jitter, packet loss rate and terminal mobility speed are required to be set for a slice corresponding to the low-delay high-reliability scenario, so as to ensure that the high-speed mobile terminals can perform highly reliable data transmission with the low delay.

Figure 7:
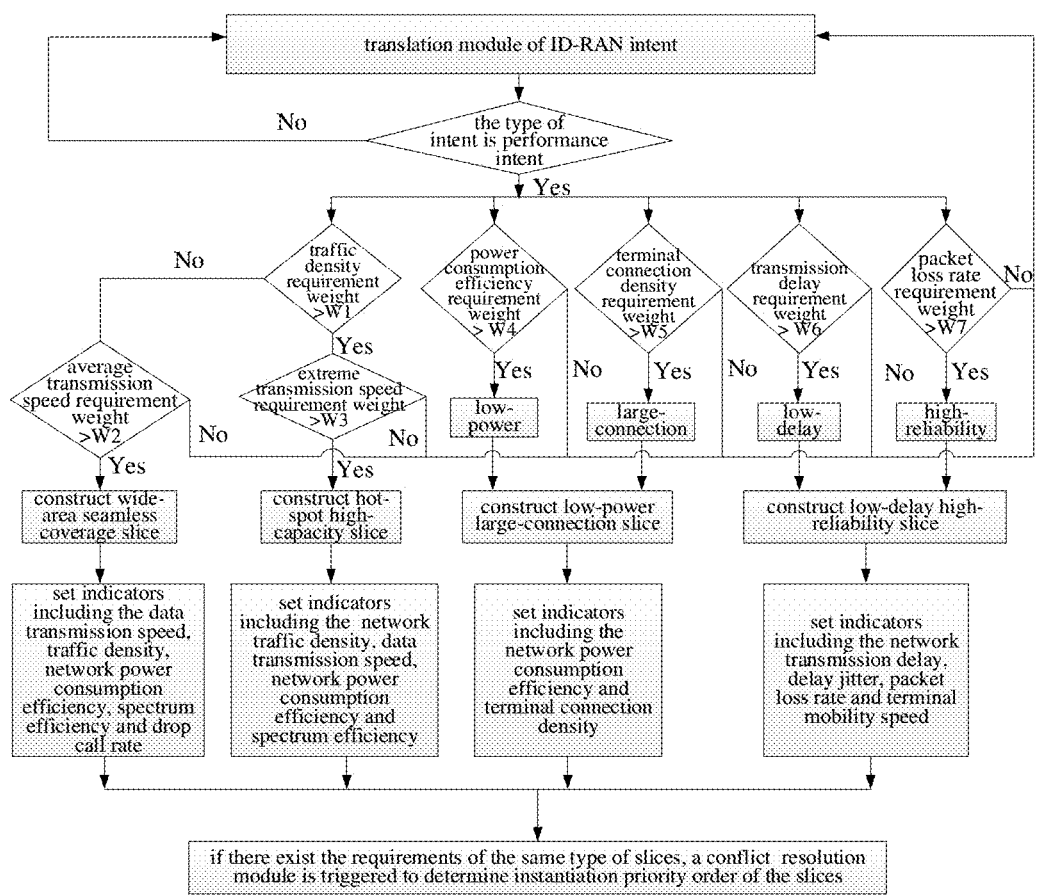
FIG. 7 is a diagram of a translation process for a performance intent according to embodiments of the present application.

A translation process of the performance intent is shown in FIG. 7. The performance intent refers to the explicit performance indicator requirements for the network. That is, the performance intent itself has indicated the threshold requirements of different network performance indicators. According to the threshold requirements of different network performance indicators indicated by the performance intent, the translation module constructs a slice type supporting a combination of corresponding network performance indicators. Afterwards, threshold requirements of the network performance indicators supported by the constructed slice type are set, and the network is divided into multiple RAN slices supporting multiple performance intents.

An initial threshold of each network performance indicator in FIG. 7 may be set as follows: a network traffic density threshold W1 is set to 1 Tbit/s/km$^2$, a network average transmission speed threshold W2 is set to 100 Mbps, a network extreme transmission speed threshold W3 is set to 1 Gbps, a network power consumption efficiency threshold W4 is set to 10 times increase, a terminal connection density threshold W5 is set to $10^6$/km$^2$, a transmission delay threshold W6 is set to 1 ms, and a packet loss rate threshold W7 is set to $10^{-5}$. The above thresholds may also be set to different values according to an actual network performance status.

For the translation process of the management control intent, the management control intent is converted into a control signaling for the RNC by the translation module. After passing through the conflict resolution module, the control signaling directly enters the activation module to perform the configuration of relevant network infrastructure components.

According to specific intent requirements, the network performance indicators corresponding to the RAN slices are set to different values. An initial value of the network performance indicator supported by each type of RAN slices may be set as follows:

For the wide-area seamless coverage slice, the network average transmission speed is set to 100 Mbps.

For the hot-spot high-capacity slice, the network traffic density is set to 10 Tbps/km$^2$, and the network extreme transmission speed is set to 10 Gbps.

For the low-power large-connection slice, the terminal connection density is set to $10^6$/km$^2$.

For the low-delay high-reliability slice, the network transmission delay is set to 1 ms, and the packet loss rate is set to $10^{-5}$.

In some embodiments, the service intent, the performance intent and the management control intent may be issued by a network service customer or a network service provider. Specifically, the intent may be captured through a Graphical User Interface (GUI) and by using a data format such as eXtensible Markup Language (XML) and Domain Specific Language (DSL), or may be represented directly by a device configuration standard machine language. Alternatively, the service intent, the performance intent and the management control intent may be obtained based on the analysis of network operation and maintenance big data and measurement data.

At step 402, an instantiation priority is determined for each slice setting. In some embodiments, the instantiation priority refers to an order of the slices corresponding to the three intent types of the service intent, the performance intent and the management and control intent being instantiated. The slice setting includes network performance indicators set for each slice and a network resource allocation strategy determined for each slice. The slice being instantiated refers to determining the network resource allocation strategy according to the slice setting required by users, and implementing the network resource allocation strategy on physical resources and devices of the RAN, that is to say, the network resource allocation strategy is instantiated, or the slice setting is instantiated.

This step is performed by the conflict resolution module.

According to the slice settings output by the intent translation module, the conflict resolution module determines an instantiation priority order of the slice settings according to an execution priority order of the service intent, the performance intent and the management control intent. The service intent refers to the types of services required by users that are provided by the network, which can be determined based on the analysis of the network operation and maintenance big data, wireless transmission big data and terminal measurement big data. Alternatively, the service intent may be a requirement of the network service customer for changing the current service scenario division of the network based on new services frequently appearing in the network. The service intent include a requirement for a type of wide-area seamless coverage service to be used to a wide-area seamless coverage scenario in which the geographical locations of terminals are relatively dispersed and the terminals have high mobility, a requirement for a type of hot-spot high-capacity service to be used to a hot-spot high-capacity scenario with a high data transmission speed in a hot-spot area, including a 3D video, AR and the like, a requirement for a type of low-power large-connection service to be used to a low-power large-connection scenario involving multiple sensor devices in a smart city; a requirement for a type of low-delay high-reliability service to be used to a low-delay high-reliability scenario in vertical industries such as the Internet of vehicles and industrial control. The performance intent refers to a threshold set for a certain KPI by the network service customer or the network service provider. The KPIs include network traffic density, extreme transmission speed, network power consumption efficiency, spectrum efficiency, terminal connection density, network transmission delay, packet loss rate, etc. The management control intent refers to an intent of the network service provider for changing the configuration of network infrastructure and physical resource, which includes the configuration of network functions such as a networking mode and network resource management. The management control intent has the highest execution priority, the performance intention has the second highest execution priority, and the service intent has the lowest execution priority. The conflict resolution module determines the instantiation priority of each slice setting output by the translation module according to the above described execution priority order of the intents.

In some embodiments, the management control intent refers to a network configuration adjustment instruction issued by a network technician who is familiar with the overall operation specification of the network, and thus the slice setting of the slice corresponding to the management control intent has the highest instantiation priority. The performance intent is an indicator issued by the network operator to ensure that the network meets the future development and to improve the network performance, and thus the slice setting of the slice corresponding to the performance intent has the second highest instantiation priority. The service intent is an intent of network senior managers to determine the network service scenarios according to new services frequently appearing in the network, so as to ensure that the network can provide users with more comprehensive service types, and thus the slice setting of the slice corresponding to the service intent has the lowest instantiation priority.

Further, the execution order of the intents may also be determined according to a Service Level Agreement (SLA) reached by the network service provider and the network service customer. Alternatively, the execution order of the intents may also be determined according to a conventional network management specification provided by the network service provider.

The instantiation priorities of the slice settings corresponding to the same type of intents are the same.

Through the above processing, the instantiation priority of each slice setting is determined.

At step 403, performance evaluation is performed for each existing slice within a network range indicated by the intent and a global slice setting is determined according to an evaluation result.

This step is performed in the evaluation module. In some embodiments, the evaluation module includes a centralized evaluation module and a distributed evaluation sub-module located in each slice.

The evaluation module evaluates the network performance of the existing slices in the current network according to historical wireless transmission data of the network and the terminal measurement report that are collected by the data collection processor, performs a reserving, adding or deleting operation for the existing slices in the network, so as to determine the global slice setting. The evaluation module of the ID-RAN includes a centralized evaluation module for evaluating the network performance of all slices in the RAN and some distributed evaluation sub-modules for evaluating the network performance of each slice.

Before determining the instantiation priority for each slice setting, the performance evaluation is performed for the existing slices in the network firstly to reduce the complexity of network operations and the instability of network performance that are caused by the frequent change of the global network configuration. In the distributed evaluation sub-module, the evaluation process includes: according to real-time wireless transmission data of the network and the terminal measurement data that are collected by the data collection processor from the RAN, and by using a Convolutional Neural Network (CNN) and a Recurrent Neural Network (RNN), extracting a spatial feature and temporal feature of the data respectively, obtaining a network performance status level corresponding to the current slice, and reporting it to the centralized evaluation module. In some embodiments, the network performance refers to a set of network spectrum efficiency, network transmission delay, network connection number, network power consumption efficiency, network delay jitter and extreme transmission speed. For different types of slices, the weight values of different network performance status levels in the set are different.

The centralized evaluation module compares the network performance of each existing slice reported by the distributed evaluation sub-module of the existing slice with the performance requirements of slice setting corresponding to each RAN slice output by the translation module. If the network performance reported by the distributed evaluation sub-module meets the performance requirements of a certain slice setting (for example, the reported network performance meets the threshold requirements of all network performance indicators in the slice setting), it is indicated that there already exists a slice meeting the performance requirements of corresponding intent in the network, and thus the slice with the reported network performance is reserved. If the reported network performance does not meet the performance requirements of any slice setting output by the translation module, the slice with the reported network performance is deleted, and network resources related to the slice are released. Afterwards, according to the instantiation priority order of slice settings corresponding to the RAN slices determined by the conflict resolution module, new slices corresponding to the RAN slices that are output by the translation module are added sequentially. The processing of the distributed evaluation sub-module and the centralized evaluation module will be described below in detail.

Figure 8:
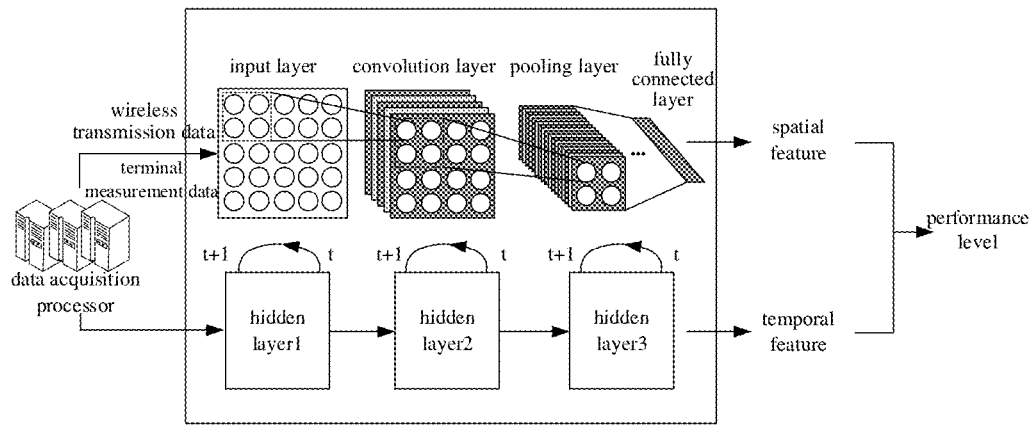
FIG. 8 is a diagram of a distributed evaluation sub-module within a slice according to embodiments of the present application.

(31) According to the real-time wireless transmission data of the network and the terminal measurement data collected by the data collection processor, the distributed evaluation sub-module in the slice obtains the spatial feature and temporal feature of the data by using the CNN and the RNN, obtains a network performance status corresponding to the measured RAN data, outputs the network performance status level corresponding to each slice, and reports it to the centralized evaluation module responsible for the performance evaluation of all RAN slices. FIG. 8 shows a diagram of a distributed evaluation sub-module within a slice. In some embodiments, the wireless transmission data includes network resources for signal transmission, such as spectrum, power and bandwidth, and the terminal measurement data includes Reference Signal Receiving Power (RSRP), Received Signal Strength Indicator (RSSI) and Signal to Interference and Noise Ratio (SINR) measured by the terminal, and user request data. Through a data feature extraction function of the CNN and the RNN, the evaluation sub-module obtains a network performance status level consistent with that used for the slice setting corresponding to the new RAN slice added by the translation module.

According to the KPIs set for each type of slices when the translation module determines the new RAN slice, a slice performance status level of the new slice may be set as following: set to level 1 when a difference between a designated performance threshold in the slice setting of the new RAN slice and the performance of each existing slice determined by the evaluation module is greater than D1; set to level 2 when the difference between the designated performance threshold in the slice setting of the new RAN slice and the performance of each existing slice determined by the evaluation module is smaller than or equal to D1, set to level 3 when the designated performance threshold in the slice setting of the new RAN slice is smaller than or equal to the performance of each existing slice determined by the evaluation module. The slice performance status level may also be divided into smaller quantified intervals according to the practical applications.

The CNN and the RNN may provide a mapping relationship between wireless transmission data, terminal measurement data and network performance statuses through a training process of historical measurement data of the network. According to the real-time wireless transmission data and terminal measurement data, a network performance status level may be obtained. The training process may be the same as a practical application mode. For example, (a) according to the historical wireless transmission data and the terminal measurement data obtained in the RAN and by using the CNN and the RNN, the spatial feature and temporal feature of the data are extracted respectively, and the network performance status level corresponding to the historical wireless transmission data and the terminal measurement data is determined; (b) the determined network performance status is compared with the actual network performance status, and the values of the weight parameters of the CNN and the RNN are adjusted according to a comparison result. Afterwards, step (a) is repeated until the comparison result is within a preset range. Every time the evaluation module obtains the real-time network performance status, the values of the weight parameters of the CNN and the RNN may be adjusted in real time according to the network performance status, so as to constantly optimize the learning model.

(32) The centralized evaluation module performs a reserving, adding or deleting operation for the existing slices according to the slice performance status levels reported by the distributed evaluation sub-modules in the slices. In some embodiments, according to the instantiation priority order of the slice setting corresponding to the new RAN slices determined by the conflict resolution module, the slice setting of each new RAN slice is compared with the performances of all existing slice in the network in turn to determine whether the performance requirements of the slice setting corresponding to the new slice is met. For example, if the instantiation priority order of slice settings determined by the conflict resolution module is CAB, it is first determined whether there is an existing slice meeting the performance requirements of the slice setting C, secondly it is determined whether the performance requirements of the slice setting A is met, and finally it is determined whether the performance requirements of the slice setting B is met. Based on the comparison result, the next processing is determined. If the performance of any existing slice in the network is greater than or equal to the performance of the slice setting of the new RAN slice (level 3) determined by the translation module, it is indicated that the performance of the existing slice meets the performance requirements of the intent, and the existing slice is reserved in the network. Otherwise, i.e., if the performances of all existing slices in the network are smaller than the performance of the slice setting corresponding to each new RAN slice, and if a difference between the performance of any existing slice in the network and the performance of the slice setting corresponding to the new RAN slice is smaller than or equal to a threshold D1 (Level 2), it is indicated that the performance of the existing slice in the network can meet the performance requirements of the intent through an intra-slice self-optimization or inter-slice self-optimization process. Thus, the existing slice in the network is reserved, and a slice performance indicator newly set by the translation module is given to the existing slice. If the difference between the performance of any existing slice in the network and the performance of the slice setting corresponding to the new RAN slice is greater than the threshold D1 (level 1), it is indicated that the performance of the existing slice in the network cannot meet the performance requirements of the intent even through intra-slice or inter-slice resource optimization. Accordingly, the existing slice is deleted and network resources related to the existing slice are released. For the existing slices that cannot meet the performance requirements of slice setting corresponding to the new RAN slice even through the optimization, a new slice is added according to an instantiation priority of slice setting corresponding to the new slice. That is, if the performance of all existing slices do not meet the performance requirements of slice setting and the difference between the performance of any existing slice in the network and the performance of the slice setting is larger than D1, new slices are added according to an instantiation priority order of the slice settings, and the slice settings are instantiated.

Through the above processing, if the existing slice in the network meets the performance requirements of all slice settings determined by the translation module, step 401 is performed; if the existing slice in the network is reserved but needs to be optimized, step 405 is performed to perform the resource optimization for the existing slice; if a new slice is added, step 404 is performed to allocate network resources to the new slice.

At step 404, a networking mode is configured for each new slice, and network multimode resources are allocated to the new slice according to the instantiation priority of the slice setting corresponding to the new slice determined at step 402.

This step is performed in the activation module.

According to the global slice settings determined by the evaluation module, the activation module configures each new slice with a dedicated networking mode and multimode resources and deploys related physical infrastructure. In some embodiments, the networking mode refers to a transmission mode supported by the RAN, which includes a global BaseBand Unit (BBU) mode referring to terminals to access to a Remote Radio Unit (RRU) and a BaseBand Unit Pool (BBU Pool) by turn, a local distributed cooperative mode referring to the terminals to access to a Remote Radio Unit with a fog calculation function (F-RRU), and a direct communication mode between the terminals (D2D). The network multimode resources refer to radio resources, cache resources and computing resources. The radio resources include time domain resources, frequency domain resources, code domain resources, space domain resources and power domain resources. The cache resources include an available storage space, cached contents and cache replacement contents. The computing resources refer to a local data processing capability of each node, a machine learning algorithm used by each node, and a data computing capability supporting the training of the machine learning model. The configuration of the networking mode and network multimode resources will be described below in detail.

(41) The Configuration of Networking Mode

According to the different requirements of different slice types for network quality and the networking mode supported by the RAN, the activation module performs the configuration of the networking mode for each slice. In some embodiments, according to the requirements of each slice for the transmission speed, the transmission delay, the connection density, the traffic density, the transmission reliability and the power consumption, a networking mode is configured for a scenario corresponding to the slice, and a relationship between the networking mode and the scenario corresponding to the slice is saved. A new slice is configured with a networking mode corresponding to the scenario of the slice. Next, a method for determining the relationship between the networking mode and the scenario corresponding to the slice is described based on a fog RAN. The networking mode of each slice may be configured flexibly according to the coverage range, computing capability and cache capability of access nodes deployed in the RAN. Based on the requirements of each slice for the transmission speed, transmission delay, terminal connection density, traffic density, transmission reliability and power consumption, the configuration of initial networking mode preferably selected by each slice type will be described below.

For the wide-area seamless coverage slice, it is necessary to support stable terminal experience speed and service continuity. Since the geographical locations of terminals are relatively dispersed and the terminals have high mobility, the global coverage may be realized through deploying High Power Nodes (HPN) to achieve the seamless coverage and avoid frequent handover.

For the hot-spot high-capacity slice, it is necessary to support the ultra-high traffic density and transmission speed. In order to support the high traffic density of the hotspot area, multiple RRUs are usually deployed near the terminals and access the BBU Pool through a fronthaul. The ultra-large-scale data processing may be realized by using the powerful processing capability of the cloud while deploying the RRUs near the terminals. In addition, considering the caching and computing capability of edge devices, some F-RRUs with the caching capability may be deployed. The frequently accessed contents may be stored locally in advance through a certain caching strategy, and a large number of requests for the same service may be processed locally, thereby reducing the difficulty of accessing the RRUs in the area with extremely high traffic density, reducing repeated data retransmission and further reducing the transmission pressure of the fronthaul.

For the low-power large-connection slice, it is necessary to support a large number of terminal connections and ultra-low terminal power consumption. In order to deal with a case that the number of terminals far exceeds the allowable number of access nodes, the terminals with a D2D module constitute a net-like or tree-like topology cluster by using a clustering mechanism and according to a D2D or relay multi-hop manner. Then, a node with a strong processing capability is selected as a cluster head node to aggregate all nodes in the cluster, and a node with the fog computing capability or a base station with the higher transmission power is selected according to the size of the cluster. The terminals without the D2D module may directly access a base station with higher transmission power.

For the low-delay high-reliability slice, it is necessary to support millisecond-level transmission delay and high reliability. To reduce the transmission delay of the terminals, a method of processing a service locally is adopted, and the D2D communication is performed through deploying the F-RRUs and configuring the cache in the terminals.

(42) The Configuration of Network Multimode Resources

The activation module performs the configuration of network resources within the slice according to the historical wireless transmission data and the terminal measurement report obtained by the data collection processor through the probe. This step is performed by both the RNC with a centralized resource management function and nodes with the distributed resource management function deployed in the RAN.

The RNC performs initial allocation of all slice resources in the network according to the information of all resources of the network that is obtained by the data collection processor, which includes the type, quantity and current usage of the resources. The RNC issues the information of available resources allocated to each slice to the distributed resource manager corresponding to the slice through a control signaling. According to the total resources available for the current slice that is determined by a radio resource manager and according to the historical access information, the service type and the current terminal access information of the slice, a distributed resource manager located in a designated node within the slice determines a resource allocation scheme for the access nodes and terminals in the slice, and reports it to the RNC, so as to adjust the initial resource allocation of the slices in the future. According to the resource allocation scheme of each slice reported by the distributed resource manager, the RNC performs the global allocation of the network resources for the physical devices such as the access nodes and the terminals within the slice, and thus activates the intra-slice resource configuration scheme.

The distributed resource manager located in the designated node within the slice is controlled by the RNC, is configured to perform the resource allocation and management within the slice, and supports the information exchange between slices to perform distributed resource adjustment between slices.

After the conflict resolution module determines the instantiation priority of each slice setting, the activation module allocates the network resources shared by the slices with the same intent type in a hard isolation mode and a soft isolation mode. The hard isolation mode refers to that the network resources occupied by the slices are in an orthogonal state, and the soft isolation mode refers to that the network resources occupied by the slices are in an orthogonal or multiplexing state. Which one of these two modes is selected based on the transmission interference and spatial distance between slices. The network resources may include radio resources, cache resources and computing resources. In some embodiments, the RNC performs initial allocation of network resources between slices according to the information of all resources of the network that is obtained by the data collection processor, which includes the type, quantity and current usage of the resources.

The RNC allocates orthogonal and multiplexed time-frequency resources to slices. The allocation principle includes: when the time-frequency resources are sufficient, the orthogonal resources are allocated to the slices, i.e., the slices are hard isolated to avoid the interference that is caused since the slices use the same resources; when the time-frequency resources are insufficient, the partial multiplexed resources are allocated to the slices between which the spatial distance exceeds a threshold, and the orthogonal resources are still allocated to the slices between which the spatial distance does not exceed the threshold. That is, for different slice settings corresponding to the same type of intents, when allocating the time-frequency resources to new slices corresponding to the different slice settings, the orthogonal resources are preferentially allocated to each new slice. If the time-frequency resources of the network are not enough to allocate the orthogonal resources to each new slice, the spatial distance between the slices is determined, the partially multiplexed time-frequency resources are allocated to the slices between which the spatial distance exceeds the preset distance threshold, and the orthogonal resources are allocated to the slices between which the spatial distance does not exceed the distance threshold.

When allocating the power resources to each slice, the RNC determines the allowable maximum transmission power of each slice through an open loop power control method, and controls the interference within each slice and between slices within an allowable range through controlling the maximum transmission power of the access nodes and the terminals in each slice, so as to ensure the normal operation of services in each slice.

When the RNC allocates cache resources and computing resources to each slice, it is necessary to set priorities according to the performance requirements of different slice types. In some embodiments, for the wide-area seamless coverage slice, the number of access terminals and the number of service requests are relatively small, and thus it is unnecessary to deploy additional caching and computing nodes for local service processing. Accordingly, the configuration priority of the cache resources and the computing resources is the lowest. For the hot-spot high-capacity slice, a small number of F-RRUs are deployed in an area with high traffic, and some services are processed locally. The deployment of the F-RRUs requires certain caching and computing capabilities, but the key performance of the slice is guaranteed mainly by the BBU Pool. Accordingly, the configuration priority of the cache resources and the computing resources is set to be the third highest. For the low-power large-connection slice, a clustering access networking mode is adopted. A node with a signal processing capability is used as a cluster head node or a key node in the cluster. Accordingly, the configuration priority of the cache resources and computing resources in this scenario is determined as the second highest. For the low-delay high-reliability slice, in order to realize the low-delay data transmission and reduce the transmission distance, it is necessary to transfer the service to a local processor as much as possible. Accordingly, the requirements for the cache resources and computing resources are the highest, and thus the configuration priority is set to the highest.

The foregoing is the initial allocation process of the network resources for all slices.

According to different performance requirements of the slices, the network resources to be configured by the distributed resource manager within the scenario corresponding to each slice are described.

For the wide-area seamless coverage slice, the distributed resource manager may be set in a device which is externally connected to a HPN and used for resource management. Since the geographical locations of the terminals are relatively dispersed and the terminals have high mobility, the transmission power of the base station and terminal handover parameters should be configured properly, thereby avoiding frequent handover and realizing seamless coverage.

For the hot-spot high-capacity slice, the distributed resource manager may be set in the BBU Pool with centralized cloud processing function. Considering the high traffic density in the hot-spot area, the terminal transmission mode, the bandwidth resources and the cache placement should be configured properly to reduce the transmission interference, release the transmission pressure of the fronthaul that is caused by the repeated data transmission, and further improve the terminal experience speed.

For the low-power large-connection slice, the distributed resource manager may be set in a node with strong fog calculation function. In order to realize the low-power connection of massive terminals, the clustering networking mode of the terminals, the transmission power of each node and the processing capability of the cluster head node should be configured properly, thereby reducing the power consumption and interference of the terminals while the number of terminals accessing the network can be increased.

For the low-delay high-reliability slice, the distributed resource manager may be set in a node with the strong fog calculation function, and the node is required to be stationary or have less mobility, and cover a certain range. In order to improve the reliability of the network and reduce the transmission delay of the network, the locally cached contents and the transmission power parameters of the base station should be configured properly, and a coding mode with a lower bit error rate and an efficient retransmission mechanism are selected.

After step 404, the flowchart of the ID-RAN networking method provided by the embodiments of the present application ends. However, the network performance status may change in real time in actual applications. Therefore, in order to adapt to the changing network performance status, the method provided by the embodiments of the present application may include the following process to further optimize the resource allocation.

At s 405, performance evaluation is performed for each slice in the network periodically and a performance evaluation result is compared with a predefined performance corresponding to the slice. When a difference between the performance evaluation result and the predefined performance is greater than a first threshold and smaller than or equal to a second threshold, the resource optimization is performed within the slice; when the difference is greater than the second threshold, the resource optimization is performed between all slices in the network.

This step is performed by the evaluation module and the optimization module. In some embodiments, the optimization module may include a centralized optimization module located in the RNC and some distributed optimization sub-modules located in each slice. The centralized optimization module is configured to perform inter-slice resource optimization, and the distributed optimization sub-module is configured to perform intra-slice resource optimization.

According to the wireless transmission data and the terminal measurement data that are obtained by the data collection processor from each slice in real time, the dedicated distributed evaluation sub-module in each slice outputs the network performance of the slice, and compares the performance of the slice with the predefined performance of the slice. The comparison manner may be set according to actual conditions, for example, the weighted sums of performance indicators are calculated and compared respectively. When the difference between the evaluated performance of the slice and the predefined performance of the slice is greater than a threshold F1 and smaller than a threshold F2, the distributed optimization sub-module of the slice performs self-optimization for the resources in the slice, and performs the above performance evaluation and comparison periodically. When the difference is greater than the threshold F2, the centralized optimization module in the ID-RAN performs the inter-slice resource optimization.

When the self-optimization within the slice is triggered, an intra-slice resource allocation strategy is obtained through Deep Reinforcement Learning (DRL). In some embodiments, the current networking mode and resource allocation of the slice are used as status variables of the DRL and are input to a node supporting the training of the machine learning model. By using the service level and resources utilization efficiency obtained based on the historical resource configuration scheme in the data collection processor, an intra-slice resource allocation adjustment strategy is output to realize the highest network resource utilization efficiency and the best service performance level.

The processing of the distributed optimization sub-module and the centralized optimization module will be described below in detail.

Figure 9:
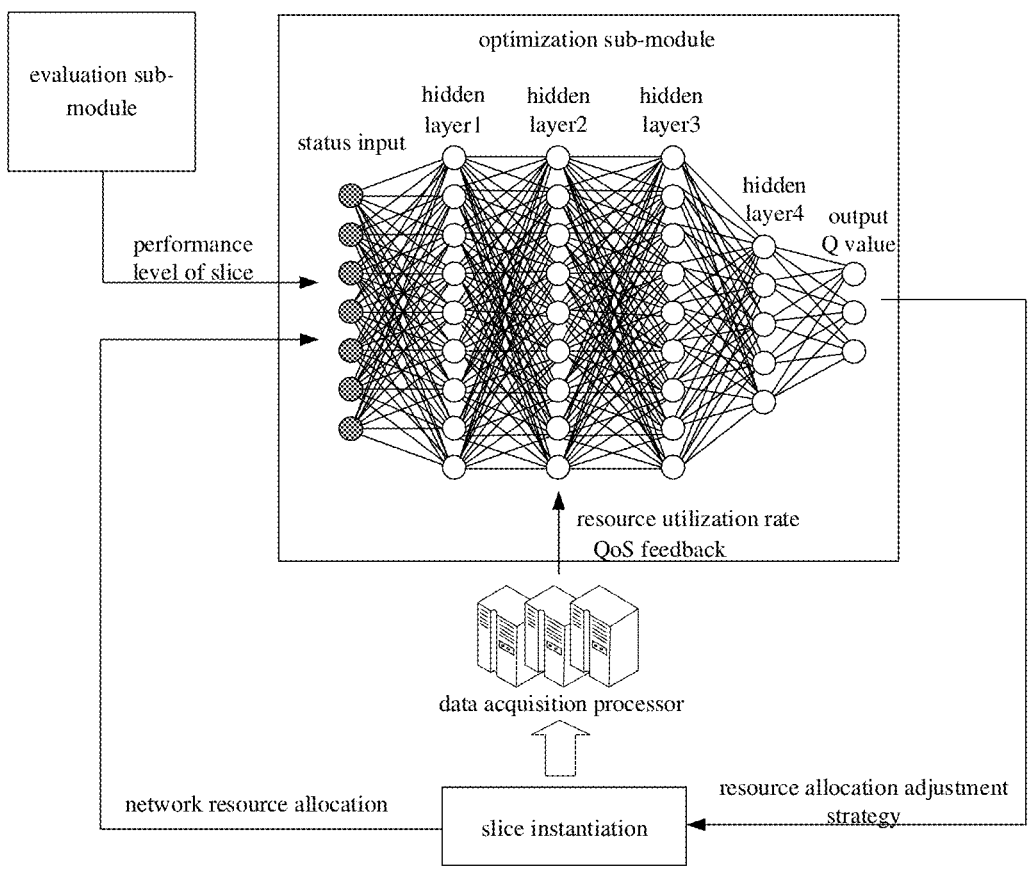
FIG. 9 is a diagram of a distributed optimization sub-module within a slice according to embodiments of the present application.
Figure 10:
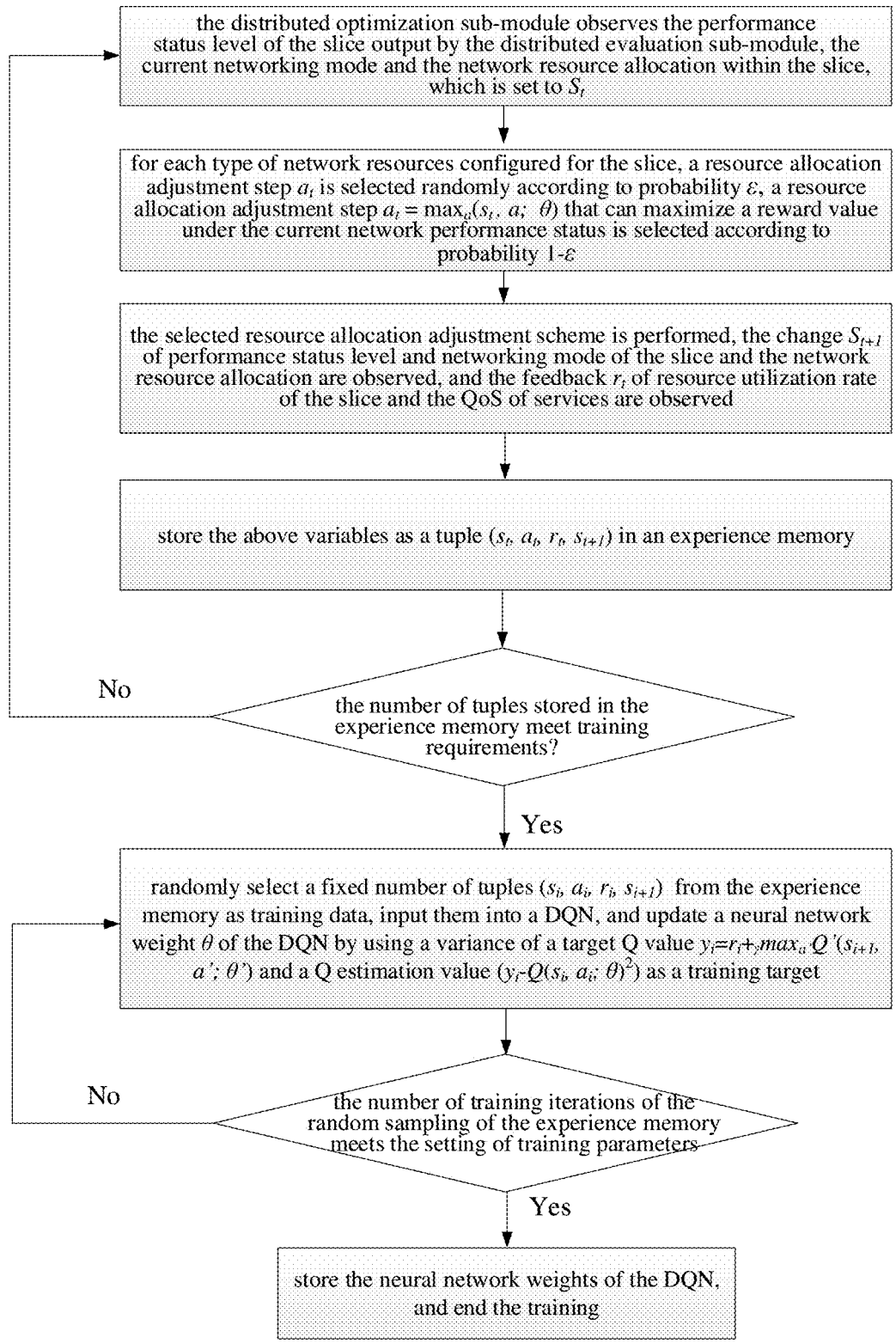
FIG. 10 is a diagram of an online training process of DRL according to embodiments of the present application.

(51) FIG. 9 shows a diagram of a distributed optimization sub-module in a slice according to some embodiments of the present application. In order to provide an adaptive resource allocation adjustment strategy according to the network performance status and by using the DRL algorithm, a computing node where the optimization sub-module is located is regarded as a smart entity, and the slice performance status level output by the evaluation sub-module, the networking mode and the network resource allocation currently used by the slice are used as the status variables of the DRL. The to-be-adjusted resource allocation ratio of each slice is used as an action variable of the DRL. After the adjustment of the resource allocation, the network resource utilization efficiency collected by the data collection processor and the performance indicators of each slice are used as DRL reward variables, and the online learning is performed through a Deep Q Network (DQN). The training process of the algorithm is distributed to the nodes supporting the training of the machine learning model in the slice. An online training process of the DRL is shown in FIG. 10.

Figure 11:
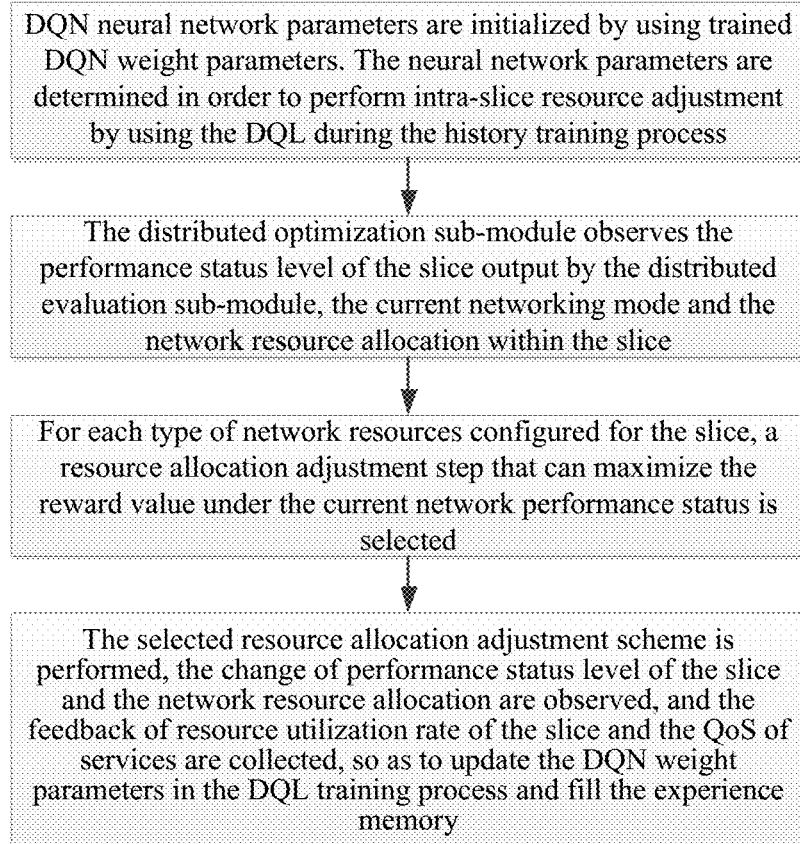
FIG. 11 is a flowchart illustrating a process of deriving a resource adjustment strategy within a slice by using a DRL training model according to embodiments of the present application.

Through performing the online training for the above DRL variables, the distributed optimization sub-module may determine a resource adjustment strategy under the current network performance status according to the historical network data, so as to maximize the resource utilization efficiency and slice performance status level. FIG. 11 shows a flowchart illustrating a process of deriving a resource adjustment strategy within a slice by using a DRL training model. The process includes following steps.

1. DQN neural network parameters are initialized by using trained DQN weight parameters. The neural network parameters are determined in order to perform intra-slice resource adjustment by using a Deep Q-Learning (DQL) during the history training process.

2. The distributed optimization sub-module observes the performance status level output by the distributed evaluation sub-module, the current networking mode and the network resource allocation within the slice.

3. For each type of network resources configured for the slice, a resource allocation adjustment step that can maximize a reward value under the current network performance status is selected.

4. The selected resource allocation adjustment scheme is performed, the change of performance status level of the slice and the network resource allocation are observed, and the feedback of resource utilization rate of the slice and the QoS of services are collected, so as to update the DQN weight parameters in the DQL training process and fill the experience memory.

It should be noted that whenever the slice is deployed in the RAN, the performance evaluation and optimization process within the slice is performed periodically and initiatively to realize the initiative prediction and automatic adjustment when the performance status level of the slice is decreased. When the difference between the performance of the current slice and the predefined performance is greater than the preset maximum threshold F2, the real-time performance of the slice is reported to the centralized evaluation module responsible for managing the overall performance of the ID-RAN, and the inter-slice resource optimization is performed.

(52) In the final stage of the intent implementation cycle, according to the real-time performance of the slice reported by the distributed evaluation sub-module within each slice, the centralized evaluation module of the ID-RAN evaluates the performance of each slice and triggers the centralized optimization module to perform the inter-slice resource optimization. In some embodiments, when the difference of the performance of the slice and the predefined performance is greater than the threshold F2, the distributed evaluation sub-modules in all slices report the real-time performances of the slices to the centralized evaluation module responsible for the performance evaluation of all slices in the RAN. The centralized evaluation module performs the following process according to the performance of each slice reported by the distributed evaluation sub-module in each slice.

(a) The centralized evaluation module calculates the performance variance of all slices according to the performance evaluation result of each slice. If the performance variance of all slices is greater than the threshold F3, the centralized optimization module is triggered to perform the inter-slice resource optimization.

(b) The best-performance slice and the worst-performance slice are selected. For each competing resource, the competing resources allocated to the slice with the best performance are reduced by N units, and N units are added to the competing resources allocated to the slice with the worst performance. The performance of each slice is re-evaluated and the step (a) is repeated until the performance variance of all slices is not greater than the preset threshold F3, or the number of the inter-slice resource reallocation operations is greater than a preset number threshold. Afterwards, the step 1 of the next intent implementation cycle is performed.

Thus, the flowchart of the intent-driven radio access networking method provided according to some embodiments of the present application ends. The structure and function of an intent-driven radio access networking system will be described below according to some embodiments of the present application.

In some embodiments, the intent-driven radio access networking system may include a translation module, a conflict resolution module, an evaluation module and an activation module.

The translation module is configured to determine an intent and perform a slice setting for a RAN slice according to a type of the intent and network performance requirements indicated by the intent. The slice setting includes a scenario corresponding to the slice and threshold requirements of each network indicator indicated by the slice. The conflict resolution module is configured to determine an instantiation priority for each slice setting. The evaluation module is configured to perform performance evaluation for each existing RAN slice, and determine whether each existing slice meets performance requirements of each slice setting. When an existing slice meets the performance requirements of any slice setting, the existing slice is reserved. When an existing slice does not meet the performance requirements of each slice setting, and a difference X between the performance of the existing slice and the performance of each slice setting exceeds a preset range, the existing slice is deleted and network resources related to the existing slice are released. When an existing slice does not meet the performance requirements of each slice setting, but a difference X between the performance of the existing slice and the performance of any slice setting is within the preset range, the existing slice is reserved and optimized. When each existing slices does not meet the performance of any slice setting and the difference X exceeds the preset range, a new slice is added according to the instantiation priority of slice setting corresponding to the new slice. The activation module is configured to set a networking mode for the new slice after the new slice is added to the current network, and configure network multimode resources for the new slice according to the instantiation priority of the slice setting corresponding to the new slice.

In some embodiments, the evaluation module may include a centralized evaluation module and a distributed evaluation sub-module located within each slice. The distributed evaluation sub-module is configured to evaluate the existing slice in which it is located, determine whether the existing slice meets the performance requirements of the slice setting, and report the evaluation result to the centralized evaluation module. The centralized evaluation module is configured to reserve the existing slice when the existing slice meets the performance requirements of any slice setting; delete the existing slice and release network resources related to the existing slice when the existing slice does not meet the performance requirements of each slice setting and a difference between the performance of the existing slice and the performance of each slice setting exceeds the preset range; reserve and optimize the existing slice when the existing slice does not meet the performance requirements of each slice setting but the difference between the performance of the existing slice and the performance of any slice setting is within the preset range; add a new slice to the current network according to the instantiation priority of slice settings corresponding to the new slice when each existing slice does not meet the performance requirements of any slice setting and the difference between performance of each existing slice and the performance of each slice setting exceeds the preset range.

In some embodiments, the system may further include an optimization module to adapt to the changing network performance status and verify the implementation effect of the intent in the network. After the optimization module is added, the evaluation module may be further configured to perform performance evaluation for any slice in the network periodically, and compare the performance evaluation result with the predefined performance of the slice. When the difference between the performance evaluation result and the predefined performance is greater than a preset first threshold and smaller than or equal to a preset second threshold, a first notification containing the information of the slice is sent to the optimization module. When the difference is greater than the second threshold, a second notification is sent to the optimization module. The first threshold is smaller than the second threshold. The optimization module is configured to perform resource optimization in the slice when receiving the first notification, and perform resource optimization between slices when receiving the second notification.

The above optimization module may include a centralized optimization module and a distributed optimization sub-module located in each slice.

The distributed optimization sub-module is configured to receive the first notification, input the current networking mode and resource allocation of the slice where it is located to a neural network model, determine the resource allocation adjustment strategy within the slice, and perform resource reconfiguration according to the resource allocation adjustment strategy. The centralized optimization module is configured to receive the second notification and calculate the performance variance of all slices in the network according to the performance evaluation results of all slices. When the performance variance of all slices is greater than the preset third threshold, the centralized optimization module determines all competing resources between the best-performance slice and the worst-performance slice. For each of the competing resources, the competing resources allocated to the best-performance slice are reduced by N units, and N units are added to the competing resources allocated to the worst-performance slice. Then, the performance of each slice is re-evaluated and the processing of this module is repeated until the performance variance of all slices is smaller than or equal to the third threshold, or the number of the inter-slice resource reallocation operations is greater than a preset number threshold.

The above intent-driven radio access networking method and system combines the technical features of AI and the RAN with a fog computing capability, and realizes the self-configuration and self-optimization of the RAN slices based on the intent network idea. According to the embodiments of the present application, an intent-driven radio access network can be established.

The embodiments of the present application also provide a non-transitory computer-readable medium storing instructions which when executed by a computer causes the computer to perform the above intent-driven radio access networking method.

The foregoing is only embodiments of the present application and is not used to limit the protection scope of the present application. Any modification, equivalent substitution and improvement without departing from the spirit and principle of the present application are within the protection scope of the present application.

What is claimed is:

1. An intent-driven radio access networking method, comprising:
   determining an intent, and performing a slice setting for a slice according to a type of the intent and network performance requirements indicated by the intent, wherein the slice setting comprises a scenario corresponding to the slice and threshold requirements of each network performance indicator indicated by the slice;
   determining an instantiation priority for each slice setting;
   performing performance evaluation for each existing slice within a network range indicated by the intent, and determining whether each existing slice meets performance requirements of each slice setting; when an existing slice meets performance requirements of any slice setting, reserving the existing slice; when an existing slice does not meet performance requirements of each slice setting and a difference between performance of the existing slice and performance of each slice setting exceeds a preset range, deleting the existing slice, and releasing network resources related to the existing slice; when an existing slice does not meet the performance requirements of each slice setting but a difference between performance of the existing slice and performance of any slice setting is within the preset range, reserving and optimizing the existing slice; when each existing slice does not meet the performance requirements of any slice setting and a difference between performance of the existing slice and the performance of each slice setting exceeds the preset range, adding a new slice to a current network according to an instantiation priority of slice setting corresponding to the new slice;

after the new slice is added to the current network, configuring a networking mode and network multimode resources for the new slice according to the instantiation priority of slice setting corresponding to the new slice.

2. The method of claim 1, after configuring the network multimode resources, further comprising:

performing performance evaluation for any slice in the current network periodically, and comparing a performance evaluation result with predefined performance of slice setting corresponding to the slice; when a difference between performance of the slice and the predefined performance is greater than a first threshold and less than or equal to a second threshold, performing intra-slice resource optimization; when the difference between the performance of the slice and the predefined performance is greater than the second threshold, performing inter-slice resource optimization for all slices in the current network, wherein the first threshold is smaller than the second threshold.

3. The method of claim 1, wherein the performing performance evaluation for each existing slice comprises:

obtaining wireless transmission data and terminal measurement data of the current network from a Radio Access Network (RAN); extracting a spatial feature and a temporal feature of the wireless transmission data and the terminal measurement data respectively by using a Convolutional Neural Network (CNN) and a Recurrent Neural Network (RNN), and deriving a network performance status corresponding to the wireless transmission data and the terminal measurement data of the current network; and wherein the determining whether each existing slice meets performance requirements of each slice setting comprises:

determining the performance of the existing slice according to the performance evaluation results and determining whether the existing slice meets the threshold requirements of each network indicator indicated by the existing slice; when the existing slice meets the threshold requirements of each network indicator, determining that the existing slice meets the performance requirements of the slice setting corresponding to the existing slice; otherwise, determining that the existing slice does not meet the performance requirements of the slice setting corresponding to the existing slice.

4. The method of claim 1, wherein the configuring network multimode resources for the new slice comprises:

allocating, by a Radio Network Controller (RNC), network resources to the new slice according to the instantiation priority of the slice setting corresponding to the new slice, and issuing a global resource allocation scheme to a distributed resource manager corresponding to the new slice through control signaling, wherein the distributed resource manager is located in a designated node of the new slice; generating, by the distributed resource manager, a resource allocation scheme used for an access node and a terminal within the new slice according to total resources available for the new slice that are determined by a radio resource manager, and historical access information, service type and actual terminal access information of the new slice, and reporting the resource allocation scheme to the RNC; allocating, by the RNC, network resources globally according to a resource allocation scheme of each new slice reported by the distributed resource manager, and triggering an intra-slice resource configuration scheme;

for a wide-area seamless coverage slice, the distributed resource manager is deployed in a device which is externally connected to a High-Power Node (HPN) and used for resource management, and mainly configures base station transmission power and a terminal handover parameter;

for a hot-spot high-capacity slice, the distributed resource manager is deployed in a BaseBand Unit Pool (BBU Pool) with strong processing function, and mainly configures a terminal transmission mode, bandwidth resources and cache placement;

for a low-power large-connection slice, the distributed resource manager is deployed in a node with strong fog calculation function, and mainly configures a clustering networking mode of a terminal, transmission power of each node and a processing capability of a cluster head node; and for a low-delay high-reliability slice, the distributed resource manager is deployed in a node with strong fog calculation function, mobility lower than a preset mobility threshold and a coverage larger than a preset range threshold, mainly configures local cached contents and base station transmission power, and selects a coding mode with a bit error rate lower than a preset bit error rate threshold and a retransmission mechanism with an efficiency higher than a preset efficiency threshold.

5. The method of claim 4, wherein, for different slice settings corresponding to the same type of intents, the RNC determines a transmission interference and a spatial distance between new slices corresponding to the slice settings, and allocates the network resources to the new slices by a hard or soft isolation mode according to the transmission interference, the spatial distance, and types, quantity and usage of all resources in the current network; the hard isolation mode refers to that network resources occupied by all slices are in an orthogonal state, and the soft isolation mode refers to that the network resources occupied by the all slices are in an orthogonal or multiplexing state;

for the different slice settings corresponding to the same type of intents, the RNC allocates power resources to the new slices corresponding to the slice settings by using an open loop power control method and constraints maximum transmission power of access nodes and terminals in each new slice to control an interference in the new slice and an interference between the new slices are both within an allowable range; and for the different slice settings corresponding to the same type of intents, when allocating cache resources and computing resources to the new slices corresponding to the slice settings, the RNC sets a highest resource allocation priority for a slice corresponding to a low-delay high-reliability scenario, sets a second-highest resource allocation priority for a slice corresponding to a low-power large-connection scenario, and sets a third-highest resource allocation priority for a slice corresponding to a hot-spot high-capacity scenario, and sets a lowest resource allocation priority for a slice corresponding to a wide-area seamless coverage scenario.

6. The method of claim 1, wherein the optimizing the existing slice comprises:
when the difference between the performance of the existing slice and the performance of any slice setting is greater than a preset first threshold and less than or equal to a preset second threshold, performing intra-slice resource optimization within the existing slice; when the difference between the performance of the existing slice and the performance of any slice setting is greater than the preset second threshold, performing inter-slice resource optimization for all slices in the current network; wherein the preset first threshold is smaller than the preset second threshold.

7. The method of claim 2, wherein the performing intra-slice resource optimization comprises:
determining an intra-slice resource allocation adjustment strategy based on deep reinforcement learning, and performing intra-slice resource reconfiguration according to the intra-slice resource allocation adjustment strategy; wherein the determining an intra-slice resource allocation adjustment strategy based on deep reinforcement learning comprises: inputting a networking mode and resource allocation status of the slice to a deep neural network model, and determining the intra-slice resource allocation adjustment strategy according to a Quality of Service (QoS) and a resource utilization rate returned from the slice; and
the performing inter-slice resource optimization for all slices in the current network comprises:
(a) calculating a performance variance of all slices in the current network according to performance evaluation results of all slices, and determining all competing resources between a slice with best performance and a slice with worst performance when the performance variance of all slices is greater than a preset third threshold; (b) for each of the competing resources, reducing competing resources allocated to the slice with the best performance by N units, and adding N units to competing resources allocated to the slice with the worst performance, performing the performance evaluation for each slice again and returning to the step (a) until the performance variance of all slices is not greater than the preset third threshold, or number of inter-slice resource reallocation operations is greater than a preset number threshold; wherein N is a positive integer.

8. An intent-driven radio access networking system, comprising: a translation module, a conflict resolution module, an evaluation module and an activation module; wherein
the translation module is configured to determine an intent, and perform a slice setting for a slice according to a type of the intent and network performance requirements indicated by the intent, wherein the slice setting comprises a scenario corresponding to the slice and threshold requirements of each network performance indicator indicated by the slice;
the conflict resolution module is configured to determine an instantiation priority for each slice setting;
the evaluation module is configured to perform performance evaluation for each existing slice within a network range indicated by the intent, and determine whether each existing slice meets performance requirements of each slice setting; when an existing slice meets performance requirements of any slice setting, reserve the existing slice; when an existing slice does not meet performance requirements of each slice setting and a difference between performance of the existing slice and performance of each slice setting exceeds a preset range, delete the existing slice, and release network resources related to the existing slice; when an existing slice does not meet the performance requirements of each slice setting but a difference between performance of the existing slice and performance of any slice setting is within the preset range, reserve and optimize the existing slice; when each existing slice does not meet the performance requirements of any slice setting and a difference between performance of the existing slice and the performance of each slice setting exceeds the preset range, add a new slice to a current network according to an instantiation priority of slice setting corresponding to the new slice;
the activation module is configured to, after the new slice is added to the current network, configure a networking mode and network multimode resources for the new slice according to the instantiation priority of slice setting corresponding to the new slice.

9. A non-transitory computer-readable medium storing instructions which when executed by a computer causes the computer to perform:
determining an intent, and performing a slice setting for a slice according to a type of the intent and network performance requirements indicated by the intent, wherein the slice setting comprises a scenario corresponding to the slice and threshold requirements of each network performance indicator indicated by the slice;
determining an instantiation priority for each slice setting;
performing performance evaluation for each existing slice within a network range indicated by the intent, and determining whether each existing slice meets performance requirements of each slice setting; when an existing slice meets performance requirements of any slice setting, reserving the existing slice; when an existing slice does not meet performance requirements of each slice setting and a difference between performance of the existing slice and performance of each slice setting exceeds a preset range, deleting the existing slice, and releasing network resources related to the existing slice; when an existing slice does not meet the performance requirements of each slice setting but a difference between performance of the existing slice and performance of any slice setting is within the preset range, reserving and optimizing the existing slice; when each existing slice does not meet the performance requirements of any slice setting and a difference between performance of the existing slice and the performance of each slice setting exceeds the preset range, adding a new slice to a current network according to an instantiation priority of slice setting corresponding to the new slice;
after the new slice is added to the current network, configuring a networking mode and network multimode resources for the new slice according to the instantiation priority of slice setting corresponding to the new slice.

* * * * *